US008140307B2

(12) United States Patent
Tomiyama et al.

(10) Patent No.: US 8,140,307 B2
(45) Date of Patent: Mar. 20, 2012

(54) DEVOLATILIZATION SIMULATION APPARATUS FOR SCREW EXTRUDERS AND DEVOLATILIZATION SIMULATION PROGRAM FOR SCREW EXTRUDERS

(75) Inventors: Hideki Tomiyama, Hiroshima (JP); Seiji Takamoto, Hiroshima (JP); Hiroaki Shintani, Hiroshima (JP); Shigeki Inoue, Hiroshima (JP)

(73) Assignee: The Japan Steel Works, Ltd, Tokyo (JP)

( * ) Notice: Subject to any disclaimer, the term of this patent is extended or adjusted under 35 U.S.C. 154(b) by 345 days.

(21) Appl. No.: 12/294,252

(22) PCT Filed: Mar. 23, 2007

(86) PCT No.: PCT/JP2007/056064
§ 371 (c)(1),
(2), (4) Date: Sep. 24, 2008

(87) PCT Pub. No.: WO2007/119506
PCT Pub. Date: Oct. 25, 2007

(65) Prior Publication Data
US 2009/0202669 A1    Aug. 13, 2009

(30) Foreign Application Priority Data
Mar. 28, 2006 (JP) .................. 2006-089096

(51) Int. Cl.
G06G 7/48 (2006.01)
(52) U.S. Cl. ......................................... 703/7
(58) Field of Classification Search .......... None
See application file for complete search history.

(56) References Cited

FOREIGN PATENT DOCUMENTS

| JP | 04-364921 | 12/1992 |
|---|---|---|
| JP | 05-050491 | 3/1993 |
| JP | 07-088927 | 4/1995 |
| JP | 09-029819 | 2/1997 |
| JP | 10-244579 | 9/1998 |
| JP | 11-245280 | 9/1999 |
| JP | 11-277604 | 10/1999 |
| JP | 2001-079831 | 3/2001 |
| JP | 2004-148722 | 5/2004 |
| JP | 3712762 | 8/2005 |

OTHER PUBLICATIONS

PolyTech, Twin-Screw Extruder Simulator (TXS tm) Demo Version 2.3, May 2006, 17 pages.*
Chen, Chi-chin, Continuous Production of Solid Polystyrene in Back-Mixed and Linear-Flow Reactors, HighBeam Research, Feb. 2000, http://www.highbeam.com/doc/1G1-61030893.html, 37 pages.*

(Continued)

Primary Examiner — David Silver
(74) Attorney, Agent, or Firm — Turocy & Watson, LLP

(57) ABSTRACT

A devolatilization simulation apparatus for screw extruders and a devolatilization simulation program for screw extruders can actually simulate the devolatilization process in a screw extruder. An extruder simulation system for simulating the conditions of devolatilization of an extruder by computationally determining the resin temperature, the pressure, the residence time, the filling ratio, the torque, the power, the solid-phase occupancy and the concentration of the volatile components in terms of distribution in the axial direction of the extruder from the configuration and the operating conditions of the extruder and the physical properties of the resin in the extruder comprising a means for arithmetically simulating the process where the concentration of the volatile components contained in the resin gradually falls as they are devolatilized by vent cylinders.

3 Claims, 17 Drawing Sheets

OTHER PUBLICATIONS

European Search Report for PCT/JP2007056064 Mailed Jun. 15, 2010.

Vergnes, et al.; A Global Computer Software for Polymer Flows in Corotating Twin Screw Extruders, Polymer Engineering and Science, Nov. 1998, vol. 38, No. 11, pp. 1781-1792.

Yang, et al.; A Model for Foam Devolatilization in an Extruder, American Chemical Society, Ind. Eng. Chem. Res., 1998, 37, pp. 1464-1472.

Biesenberger, et al.; Devolatilization of Polymer Melts in Single-Screw Extruders, Polymer Engineering and Science, Sep. 1982, vol. 22, No. 13, pp. 832-835.

Biesenberger, et al.; Devolatilization of Polymer Melts: Machine Geometry and Scale Factors, Polymer Engineering and Science, Mid-Dec. 1990, vol. 30, No. 23, pp. 1493-1499.

International Search Report for PCT/JP2007/056064 dated Jun. 5, 2007.

* cited by examiner

FIG. 8

ANALYSIS WIZARD

INPUT DATA ON RESIN PHYSICAL PROPERTIES.

DATA ON RESIN PHYSICAL PROPERTIES

| | | |
|---|---|---|
| SOLID DENSITY(O) | 920 | kg/m^3 |
| SOLID THERMAL CONDUCTIVITY(T) | 0.380 | J/m.sec.K |
| SOLID SPECIFIC HEAT(H) | 2070.00 | J/kg.K |
| MELT DENSITY(M) | 750 | kg/m^3 |
| MELT THERMAL CONDUCTIVITY(C) | 0.335 | J/m.sec.K |
| MELT SPECIFIC HEAT(E) | 2800.00 | J/kg.K |
| QUANTITY OF HEAT FOR MELTING(F) | 330000 | J/kg |
| MOLTING POINT(L) | 125 | °C |

STORE RESIN DATA(S)...
REGISTER RESIN DATA(R)

CANCEL  <RETURN(B)  NEXT(N)>  COMPLETE

FIG. 9

ANALYSIS WIZARD                                                                 [X]

A NAME OF VOLATILE COMPONENT(N): [ACETONE]

○ TEMPERATURE/
   VAPOR PRESSURE(T)           CONSTANT A(A): [7.2397]

◉ Antoine FORMULA(N)           CONSTANT B(B): [1279.87]

CONSTANT C(C): [237.50]

[Log(P)=A-B/(C+t)]

┌─ DATA ON VOLATILE COMPONENT PHYSICAL PROPERTIES ─────────────┐

MOLECULAR WEIGHT(&):                    [86.17]   g/mol

BOILING POINT(&):                       [67.00]   °C

SPECIFIC HEAT@25°C(&):                  [0.527]   cal/g/deg.C

DENSITY@20°C(&):                        [0.67]    g/cm3

LATENT HEAT OF VAPORIZATION
   @BOILING POINT(&):                      [80.07]   cal/g/deg.C

CRITICAL TEMPERATURE(&):                [234.50]  °C

CRITICAL PRESSURE(&):                   [30.10]   MPa

CRITICAL DENSITY(&):                    [0.234]   g/cm3

MUTUAL INTERFERENCE
   COEFFICIENT(&):                         [0.30]

└──────────────────────────────────────────────────────────────┘

[READ IN DATA ON PHYSICAL
                                            PROPERTIES(L)...]

[CANCEL]  [<RETURN(B)] [NEXT(N)>]  [COMPLETE]

DEVOLATILIZATION SIMULATION APPARATUS FOR SCREW EXTRUDERS AND DEVOLATILIZATION SIMULATION PROGRAM FOR SCREW EXTRUDERS

TECHNICAL FIELD

This invention relates to a devolatilization simulation apparatus for screw extruders and also to a devolatilization simulation program for screw extruders that are designed to simulate the filling ratio, the pressure, the temperature, the solid-phase occupancy, the residence time, the torque, the power and the concentration of the volatile components in the inside of an extruder for the purpose of determining the screw configuration of the extruder and predicting the physical properties of the resin in an extruder.

BACKGROUND ART

"EXTRUCAD" and "NEXTRUCAD" developed by Poly-Dynamics INC. in Canada are known as techniques for predicting the physical properties of the resin in a single screw extruder.

The pressure distribution, the temperature distribution and the solid-phase occupancy distribution can be predicted in the axial direction of an extruder by means of the above-cited software. Similarly, "WinSSD" of Polymer Processing Institute in the United States and "REX" of Paderborn University and "EXTRUDER" of Compulast in Germany are also known as software designed to predict the physical properties of the resin in a single screw extruder.

"AKRO-CO-TWIN SCREW" is known as software developed by Akron University in the United States for twin screw extruders. With this software, the distributions of resin temperature, pressure, filling ratio, solid-phase occupancy and so on can be obtained by computations in the axial direction of a co-rotating twin screw extruder.

J. L. White et al. of Akron University also report studies on predicting the physical properties of the resin in a counter-rotating twin screw extruder (Intern. Polymer Processing, XII, 3, p. 278 (1997)).

Toyama et al. in Japan describe the development of similar software (Tomiyama, Ishibashi and Inoue; Japan Steel Works Technical Review No. 55 (2003) 32). An arithmetic technique of adding an index of dispersion and distribution as for an extruder operation simulation system is also known (see Patent Document 1 listed below).

As an arithmetic tool for co-rotating twin screw extruders, "TEX-FAN" developed by the Japan Steel Works in Japan, "TXS" developed by Polymer Processing Institute in the United States, "SIGMA" developed by Paderborn University in Germany and "LUDOVIC" developed by CEMEF in France are also well known as software similar to "AKRO-CO-TWIN SCREW".

Experimental and logical attempts for predicting the concentration of the volatile components contained in the resin in an extruder have been made. They include the devolatilization model proposed by G. A. Latinen. ("Devolatilization of plastics", DVI-Gesellschaft Kunstofftechnik (1980) and the attempts of Wang et al. (N. H. Wang, N. Hashimoto: Journal of Chemical Engineering of Japan, 33, 3 (2000)353), Yang (C. T. Tang and T. G. Smith: SPEANTEC '96 Tech. paper (1996) 350) and Lindt (W. R. Foster and J. T. Lindt: Polym. Eng. Sci., 30, 11 (1990)621). Theoretical formulas for devolatilization have been proposed as techniques of predicting the devolatilization process in an extruder.

Patent Document 1: Japanese Patent Publication No. 3,712,762

DISCLOSURE OF THE INVENTION

Problem to be Solved by the Invention

While "NEXTRUCAD" and "WinSSD" can predict the resin temperature, the pressure and the melting ratio in the axial direction of the screws of an extruder, they cannot predict the moisture content and the concentration of the volatile components of the resin in a devolatilization process, where a vent port is provided.

Additionally, while "AKRO-CO-TWIN SCREW" can compute the distributions of resin temperature, pressure, melting ratio, power and residence time in the axial direction of the screws, it is not satisfactory because it cannot computationally predict the concentration of the volatile components in the devolatilization process that is employed in many twin screw extruders. In other words, the actual conditions of the devolatilization process cannot be simulated if an extruder is designed by arranging vent cylinders for the purpose of analysis.

On the other hand, the studies on devolatilization by Latinen, Wang and Yang are for computationally determining the concentration balance of the volatile components in the devolatilization region in a screw extruder to predict the progress of the devolatilization process by means of a gas-liquid equilibrium model involving diffusion of the volatile components in the resin. Therefore, these studies are theoretical studies putting stress on making the devolatilization mechanism clear and cannot be applied to the prediction of the progress of the devolatilization process in the axial direction of the screw extruder.

When actually simulating the devolatilization process in a screw extruder, it is necessary to computationally determine the resin temperature, the pressure, the residence time, the filling ratio, the torque, the power, the solid phase occupancy and the concentration of the volatile components in terms of distribution in the axial direction of the extruder.

The present invention is made to solve the above problem. Therefore, the object of the present invention is to provide a devolatilization simulation apparatus for screw extruders and a devolatilization simulation program for screw extruders that can actually simulate the devolatilization process in a screw extruder.

Means for Solving the Problem

In an aspect of the present invention, the above object is achieved by providing a devolatilization apparatus for screw extruders that is an extruder simulation system for simulating the conditions of devolatilization of an extruder by computationally determining the resin temperature, the pressure, the residence time, the filling ratio, the torque, the power, the solid-phase occupancy and the concentration of the volatile components in terms of distribution in the axial direction of the extruder from the configuration and the operating conditions of the extruder and the physical properties of the resin in the extruder, the apparatus comprising a means for arithmetically simulating the process where the concentration of the volatile components contained in the resin gradually falls as they are devolatilized by vent cylinders.

Preferably, in the devolatilization simulation apparatus for screw extruders according to the present invention, the arithmetic simulation of the process where the concentration of the volatile components contained in the resin gradually falls as they are devolatilized by vent cylinders is that of flash devolatilization, surface refreshment devolatilization, foam devolatilization or a combination of any of them.

Preferably, the devolatilization simulation apparatus for screw extruders according to the present invention comprises a means for determining an optimum devolatilization arithmetic technique among the flash devolatilization, the surface refreshment devolatilization, and the foam devolatilization for arithmetic similation according to the arrangement of the screws, the cylinders and the liquid adding nozzles in the extruder.

Preferably, the devolatilization simulation apparatus for screw extruders according to the present invention is further comprises an arithmetic means for arithmetically simulating the fall by a flash of the concentration of the contained volatile components of the resin flown into the extruder by the vent device of a downstream stage in the arithmetic simulation of the flash devolatilization process.

Preferably, in the devolatilization simulation apparatus for screw extruders according to the present invention, the means for arithmetically simulating the flash devolatilization process is executed by using the formulas (1) through (4) shown and described hereinafter.

Preferably, the devolatilization simulation apparatus for screw extruders according to the present invention further comprises an arithmetic means for arithmetically simulating the fall of the concentration of the contained volatile components of the resin by surface refreshment of solution by means of rotation of the screw at the vent of an upstream stage in the arithmetic simulation of the surface refreshment devolatilization process.

Preferably, in the devolatilization simulation apparatus for screw extruders according to the present invention, the means for arithmetically simulating the surface refreshment devolatilization process is executed by using the formulas (5) through (7) shown and described hereinafter that uses the surface area L' of the resin from which the volatile components splash away in the devolatilization region as computed from the specific designs of the screws in the extruder, the sizes of the extruders and the filling ratio.

Preferably, the devolatilization simulation apparatus for screw extruders according to the present invention further comprises an arithmetic means for arithmetically simulating the fall of the concentration of the contained volatile components of the resin that takes place as an additive is injected into the polymer, causing the polymer to foam under reduced pressure and diffusing the volatile components contained in the resin into the foam in the arithmetic simulation of the foam devolatilization process.

Preferably, in the devolatilization simulation apparatus for screw extruders according to the present invention, the means for arithmetically simulating the foam devolatilization process is executed by computationally determining the internal pressure of the foam from the partial pressure of the volatile components as expressed by the formula (9) shown and described hereinafter that is determined from the diffusion formula of the volatile components into the foam whose inner pressure is expressed by the formula (8) shown and described hereinafter and the partial pressure of the additive as expressed by the formula (10) shown and described hereinafter and arithmetically determining the foam diameter in the process where the foam grows accordingly and the change with time of the internal pressure distribution of the foam by using the formulas (11) and (12) shown and described hereinafter.

In another aspect of the present invention, there is provided a devolatilization simulation program for screw extruders that is an extruder simulation program for simulating the conditions of devolatilization of an extruder by computationally determining the conditions of distribution of physical parameters in the inside of the extruder from the configuration and the operating conditions of the extruder and the physical properties of the resin, the program causing a computer to execute the step of arithmetically simulating the process where the concentration of the volatile components contained in the resin gradually falls as they are devolatilized by vent cylinders.

Advantages of the Invention

As described above, according to the present invention, the concentration of the volatile components contained in the resin in an extruder can be computationally determined as distribution in the axial direction of the screws when the configurations of the screws, the cylinders and the liquid adding nozzles of the extruder, the operating conditions of the extruder and/or the resin to be extruded and the physical properties of the volatile components contained in the resin are changed. At the same time, since the distributions of filling ratio, pressure, temperature, solid-phase occupancy, residence time, torque and power in the inside of the extruder and also the ESP can be computationally determined, the present invention provides an advantage that the conditions in the inside of the extruder in a devolatilization process can be quickly simulated on a computer.

Additionally, the configuration of any of various apparatus and the operating conditions of such an apparatus can be tested by computations, operating a program, without spending days in extrusion experiments, that are conventionally required.

Furthermore, according to the present invention, scaling up of a small extruder to a large extruder can be predicted with a high degree of accuracy.

BRIEF DESCRIPTION OF THE DRAWINGS

FIG. 8 is a schematic illustration of an image prompting the user to input data on the physical properties of the resin;

FIG. 9 is a schematic illustration of an image prompting the user to input data on the physical properties of a volatile constituent of the resin;

EXPLANATION OF REFERENCE SYMBOLS 1,2: liquid adding nozzle
3-6: vent cylinder
7: hopper cylinder
8: full flight screw
9: kneading disk

BEST MODE FOR CARRYING OUT THE INVENTION

Firstly, an embodiment of the present invention will be summarily described below. This embodiment of the invention is a simulation means for computationally determining the filling ratio, the pressure, the temperature, the solid-phase occupancy, the residence time, the torque and the power in the inside of an extruder in terms of distribution in the axial direction of the extruder, using the resin physical property parameters of the resin to be used for simulation including the shearing viscosity, the specific heat, the thermal conductivity, the density and the melting point, the conditions of the apparatus having screws, cylinders, liquid adding nozzles of the extruder and the operating conditions including the size, the rate of resin extrusion, the number of revolutions per unit time of the screws, the defined cylinder temperatures, wherein a means is formed for computationally determining the process where the volatile components contained in the resin is gradually removed by each vent and the concentration of the volatile components changes.

Figure 1:
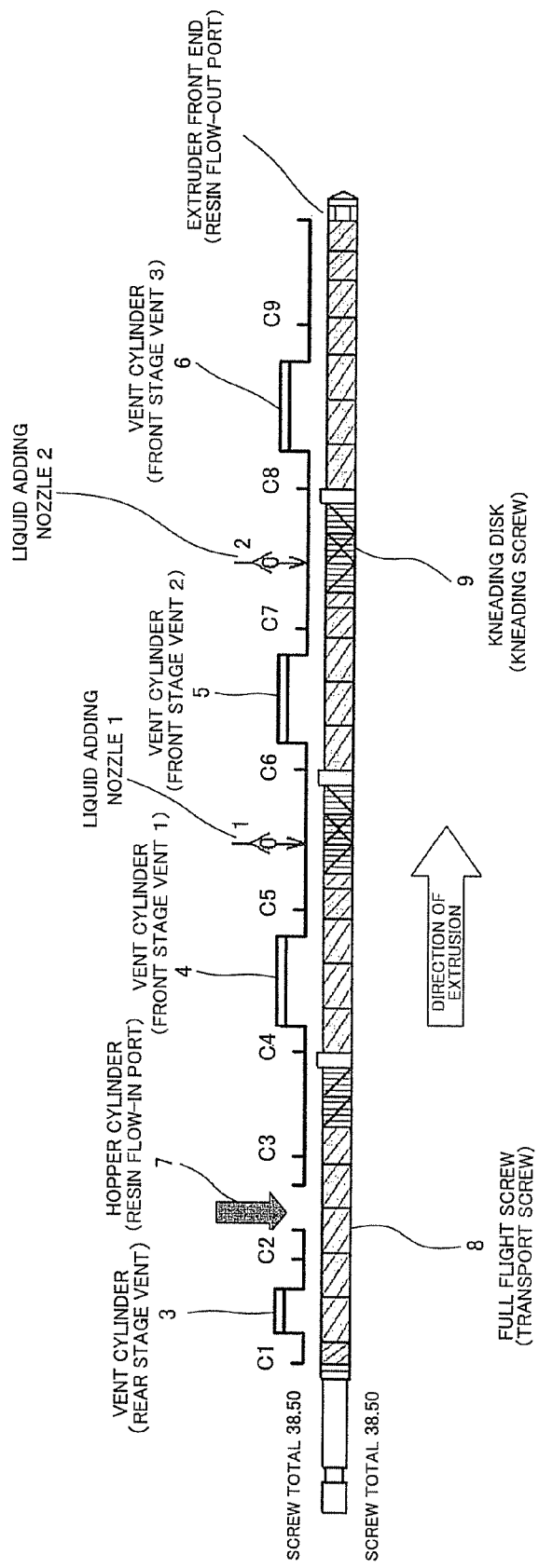
FIG. 1 is a schematic lateral view of a typical extruder, illustrating a devolatilization extrusion process.

FIG. 1 is a schematic lateral view of a typical extruder, illustrating a devolatilization extrusion process. Molten resin that contains volatile components flows in from a hopper cylinder and then the volatile components are mostly removed (and the resin is devolatilized) from the vent cylinder of a downstream stage by a flash. The concentration of the volatile components can be computationally determined by means of the formula (2), (3), (4) and (5) shown below.

In these formulas, $C_{out}$ is the quantity of the volatile components that flow out, $C_{AO}$ is the equilibrium concentration, $C_{DEV}$ is the quantity of the discharged volatile components, $\omega$ is the expansion factor, $\rho$ is the density of the mixture solution, $\rho_{AR}$ is the density of the volatile components at a reference temperature, $\rho_A$ is the density of the volatile components in the mixture solution, $\rho_P$ is the density of the resin, $S_A$ is the saturated vapor pressure of the volatile components, $P_A$ is the partial pressure of the volatile components and $\chi$ is the mutual interference coefficient of the volatile components.

[formula 1]

$$C_{DEV} = \frac{x}{100} Q - C_{OUT} \qquad (2)$$

[formula 2]

$$\rho_A = \rho_{AR} \times \omega \qquad (3)$$

[formula 3]

$$\rho = \frac{1}{\frac{1-x/100}{\rho_P} + \frac{x}{100} \cdot \frac{1}{\rho_A}} \qquad (4)$$

[formula 4]

$$C_{A0} = \frac{\left(\frac{P_A}{S_A}\right) \cdot \left(\frac{\rho_A}{\rho}\right)}{\exp(1+\chi)} \qquad (5)$$

After a flash, the resin that contains the residual volatile components is conveyed in the extruder by the full flight screw and, if necessary, kneaded by a kneading disk. Then, the resin is subjected to surface refreshing devolatilization by the vent cylinder of an upstream stage to remove the volatile components.

The concentration of the volatile components in this step is generally computationally determined by a means for executing the arithmetic operation of the formula (8). However, it can alternatively be determined by means of the formulas (9), (10) and (11) shown below, using the surface area L' of the resin from which the volatile components splash away in the devolatilization region as computed from the specific designs of the screws in the extruder and the sizes of the extruders, which are input items as shown in the drawings and the filling ratio computed in an arithmetic process.

In these formulas, $C_{in}$ is the concentration of the volatile components that flow in, $C_{out}$ is the concentration of the volatile components that flow out, $C_A$ is the equilibrium concentration in the devolatilization region, K is the mass transfer coefficient, D is the diffusion coefficient, S is the exposed surface area per unit length, L is the length of the devolatilization region, K' is a parameter that is determined according to the devolatilization diffusion coefficient, L' is the surface area of the resin from which the volatile components splash away in the devolatilization region, N is the number of revolutions per unit time of the screws, Q is the extruded quantity, $P_C$ is the atmospheric pressure, $P_V$ is the vapor pressure of the volatile components, $\rho_g$ is the density of the volatile components, $\rho_P$ is the density of the resin, $\chi$ is the mutual interference coefficient and X is the devolatilization efficiency.

[formula 5]

$$\ln\left(\frac{C_{in} - C_A}{C_{out} - C_A}\right) = K\rho_P \frac{SL(DN)^{\frac{1}{2}}}{Q} \qquad (8)$$

[formula 6]

$$\frac{C_{in} - C_A}{C_{out} - C_A} = X \qquad (9)$$

$$= \exp\left(\frac{K'L'N^{\frac{1}{2}}}{Q}\right)$$

[formula 7]

$$C_{out} = C_A + \frac{C_{in} - C_A}{X} \qquad (10)$$

-continued

[formula 8]

$$C_A = \frac{P_C}{P_V} \frac{\rho_g}{\rho_P} / \exp(1+\chi) \quad (11)$$

As shown in FIG. 1, there is a foam devolatilization step where an additive is injected into the extruder by means of a liquid adding nozzle in the immediately preceding kneading region of the vent cylinder of an upstream stage, generating and growing the foam by the change in the resin pressure in the extruder, bursting the foam at a stroke in an unfilled area of the vent cylinder after diffusing the volatile components contained in the resin in the foam, and quickly removing the volatile components diffused into the foam.

With the means for arithmetically simulating the foam devolatilization step, the internal pressure of the foam is computed from the partial pressure of the volatile components as determined by the formula (18) that is determined from the formula of diffusion of the volatile components into the foam of the formula (17) and the partial pressure of the additive by means of the formula (19) shown hereinafter. Then, as a result, the bubble diameter in the growing process of the foam and the change with time of the distribution of the internal pressure of the foam can be computationally determined from the formulas (13) and (14) shown below.

In these formulas, $C_{in}$ is the concentration of the volatile components that flow in, $C_{out}$ is the concentration of the volatile components that flow out, $C_A$ is the equilibrium concentration in the devolatilization region, K' is a parameter that is determined according to the devolatilization diffusion coefficient, A is the surface area of the foam, N is the number of revolutions per unit time of the screws, Q is the extruded quantity, n is the mole number of the volatile components per foam, $R_g$ is the gas constant, T is the atmospheric temperature, $P_{DA}$ is the partial pressure of the volatile components in the foam and $P_{DB}$ is the partial pressure of the additive in the foam.

[formula 9]

$$\frac{dR}{dt} = \frac{R}{4\eta}\left(P_D - P_C - \frac{2\gamma}{R}\right) \quad (13)$$

[formula 10]

$$\frac{dP_{DB}}{dt} = \frac{3DR_gT}{R}\frac{\partial c}{\partial R}\bigg|_{r=R} - \frac{3P_D}{R}\frac{dR}{dt} \quad (14)$$

[formula 11]

$$\frac{C_{in} - C_A}{C_{out} - C_A} = X$$

$$= \exp\left(\frac{K'AN^{\frac{1}{2}}}{Q}\right) \quad (17)$$

[formula 12]

$$P_{DA} = \frac{nR_gT}{V_A} \quad (18)$$

[formula 13]

$$P_D = P_{DA} + P_{DB} \quad (19)$$

While the process of FIG. 1 includes a flash devolatilization step, a surface refreshment devolatilization step and a foam devolatilization step, the devolatilization process of an extruder may include only a single step of a flash devolatilization step, a surface refreshment devolatilization step or a foam devolatilization step or a combination of a flash devolatilization step and a surface refreshment step depending on the quality of the resin to be obtained and the configuration of the extruder.

This embodiment of the present invention automatically determines the type of devolatilization process to be used as the configurations and the operating conditions of the screws, the cylinders and the liquid adding nozzles are defined on program operation to make it possible to predict the devolatilization phenomenon that takes place in the actual extrusion process.

Now, the computation of flash devolatilization will be described below.

Figure 2:
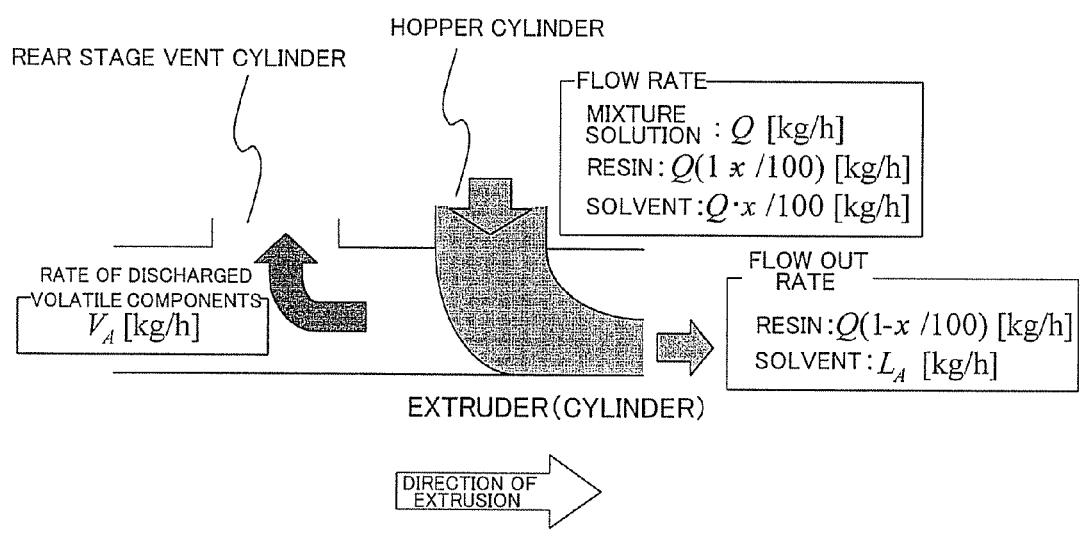
FIG. 2 is a schematic illustration of the mass balance of flash devolatilization.

If the concentration of the volatile components (solvent) contained in the extruded quantity Q[Kg/h] of resin when resin is forced to flow into an extruder is x[wt %], the mass balance of flash devolatilization can be illustrated by FIG. 2.

If the quantity of the volatile components that flow out, or $C_{OUT}$, is assumed to fall to the equilibrium concentration $C_{AO}$, the concentration balance of the volatile components in the mixture solution that flows out can be expressed by the formula (1) shown below.

[formula 14]

$$\frac{C_{OUT}}{Q\left(1 - \frac{x}{100}\right) + C_{OUT}} = C_{A0} \quad (1)$$

The quantity of the discharged volatile components, or $C_{DEV}$, can be determined from the formula (2). As seen from the formulas, the remaining quantity of the volatile components, or $C_{OUT}$, (the quantity of the volatile components that flows out of the formula (1)) and the quantity of the discharged volatile components, or $C_{DEV}$, can be determined once $C_{AO}$ is computationally determined.

$C_{AO}$ is computationally determined by following the sequence described below. Firstly, the density of the volatile components in the mixture solution, or $\rho_A$ is determined from the formula (3), using the expansion factor ω, the density of the volatile components at the reference temperature, or $\rho_{AR}$, that can be led out from the relationship of the partial pressure of the volatile components and the critical pressure and the relationship of the flash temperature (the temperature of the resin that flows in) and the critical temperature.

Then, the density of the mixture solution ρ at the flash temperature is determined from the formula (4).

$\rho_P$ is the resin density. The equilibrium concentration of the volatile components can be determined from the formula (5) by using the densities that are obtained in the above described manner.

$\chi$ is the mutual interference coefficient, which can be determined by the generally well known formula (6), which is the Flory-Huggins formula (P. J. Flory: "Principles of Polymer Chemistry", Cornell University Press, Ithaca, N. A., (1953)).

In the formula (6), $P_0$ is the vapor pressure of the volatile components and $V_A$ is the volume ratio of the volatile components in the resin.

[Formula 15]

$$\chi = \frac{\ln\left(\frac{P_A}{P_0}\right) - \ln V_A - (1 - V_A)}{(1 - V_A)^2} \quad (6)$$

As the discharged quantity of the volatile components, or $V_A$ is computed, the removed thermal energy E due to devolatilization can be determined by the formula (7) shown below. Therefore, the fall of the resin temperature by the flash devolatilization can be computationally determined. In the formula (7), $J_A$ is the latent heat of vaporization of the volatile components.

[formula 16]

$$E = V_A \times J_A \quad (7)$$

Now, the computation of surface refreshment devolatilization will be described. A theoretical model of the surface refreshment devolatilization process by an extruder can be obtained by computations, typically using the formula (8) and proposed by G. A. Latinen ("Devolatilization of viscous polymer systems", Adv. Chem. Ser., 34, 235 (1962)).

With the computation of the devolatilization region using the known formula (8), the exposed surface area is a constant if the filling ratio is assumed to be constant so that the devolatilization diffusion coefficient can be expressed by $K' = KD^{1/2}\rho_p S$. Therefore, the computation of converting to $$\ln((C_{in} - C_A)/(C_{out} - C_A)) = K''LN^{1/2}/Q$$

that of converting to $$\ln((C_{in} - C_A)/(C_{out} - C_A)) = K''N^{1/2}/Q,$$

where the devolatilization length itself is turned to be constant, is generally employed.

In this embodiment of the present invention, the filling ratio is computed on the basis of the specific configuration of the screws in the extruder and the size of the extruder at the same time. Therefore, the surface area of the resin from which the volatile components splash away in a specific devolatilization region can be computationally determined.

When the devolatilization diffusion coefficient and the surface area of the resin from which the volatile components splash away in the devolatilization region are defined to be $K' = KD^{1/2}\rho_p$ and $L' = SL$ respectively, the formula (8) can be expressed by the formula (9) in order to determine the devolatilization effect X.

The devolatilization diffusion coefficient K' is a parameter that is significantly influenced by the physical properties of the source material resin and the profiles of the screws. As the devolatilization efficiency X is determined from the right side of the formula (9), the concentration of the volatile components $C_{out}$ contained in the resin after the devolatilization can be determined from the formula (10).

The value determined by the formula (11) is employed for the equilibrium concentration $C_A$.

Now, the computation of foam devolatilization will be described below. Foam devolatilization is applied to a case where a liquid additive is added in a kneading region immediately before the resin is devolatilized by a vent cylinder. It is assumed that, after the injection, the temperature of the additive is raised to the boiling point, while the additive is being dispersed. Then, the heat emission of the resin in the region is suppressed by the sensible heat of the additive. The additive that is gasified in this way becomes foam, of which bubbles grow as the pressure changes in the kneading region. The volatile components contained in the resin are diffused into the foam and, as a result, the concentration of the volatile components in the resin falls. As resin flows into the vent region so as to give rise to an unfilled state, bursting the foam at a stroke. Thus, the additive and the volatile components that are diffused in the foam are entirely removed in the vent region.

The number of bubbles that can be observed after the injection of the additive can be computed from formula (12) for determining the bubble core generation rate. In the formula (12), $k_B$ is the Boltzmann constant, m is the mass per particle, $N_A$ is the Avogadro's number and $f_0$ and F are constants.

[formula 17]

$$J = f_0 \sqrt{\frac{2\gamma}{\pi m}} \cdot \exp\left\{-\frac{16\pi\gamma^3 F}{3k_B T (C_0/k_H - P_C)^2}\right\} C_0 N_A \quad (12)$$

The bubble size that is grown only by the additive is computed by the above described formulas (13) and (14) and the formulas (15) and (16) shown below.

[formula 18]

$$R_0 = \frac{2\gamma}{C_0/k_H - P_C} \quad (15)$$

[formula 19]

$$P_{D0} = \frac{C_0}{k_H} \quad (16)$$

The formula (13) is led out from the law of conservation of momentum and provides the currently known popular bubble growth models including the one proposed by Taki et al. (Kentaro Taki, "An Experiment for Visualizing the Micro-Bubbles Forming Behavior of a Polymer Material and a numerical simulation", a Doctoral Thesis of Kyoto University (2005)). The formula (14) is a model of temporal change of the internal pressure of foam formulated according to the Fick's first law and is also generalized by Taki, et al. The formula (14)' shown below is obtained by applying the growth rate formula in an environment dominated by nucleic acids as proposed by Han et al. (C. Han and H. Yoo, Polym. Eng. Sci., 21 (1981)518) to the formula (14).

In the above formulas, R is the bubble half diameter, $\eta$ is the resin viscosity, $P_D$ is the internal pressure of foam, $P_{DB}$ is the partial pressure of the additive in the foam, $P_C$ is the atmospheric pressure, $\gamma$ is the surface tension, D is the diffusion coefficient, $R_g$ is the gas constant, T is the atmospheric temperature $k_H$ is the Henry's constant, $R_0$ is the initial bubble half diameter, $P_{D0}$ is the initial internal pressure of foam, $C_0$ is the concentration of the additive and t is time.

[formula 19]

$$\frac{dP_{DB}}{dt} = \frac{6DR_g Tk_H (P_{D0} - P_D)}{R^2} \cdot \frac{1}{-1 + \sqrt{1 + \frac{2/R^3}{R_g Tk_H}\left\{\frac{P_D R^3 - P_{D0} R_0^3}{P_{Do} - P_D}\right\}}} - \frac{3P_D}{R}\frac{dR}{dt} \quad (14)'$$

The formulas (15) and (16) are for the initial conditions of the bubble diameter and the internal pressure of foam and can be led out from the formulas (13) and (14) respectively.

While $P_D = P_{DB}$ when the foam is grown only by the additive as in the case of general foam models, not only the gasified additive but also the volatile components contained in the resin have to be diffused for the growth of foam in a devolatilization process. Therefore, the models shown below have to be somehow added to the formulas (13) through (16) for the growth of foam.

Not only the gasified additive but also the volatile components contained in the resin are diffused in the grown bubbles. The diffusion of the volatile components in the bubbles can be computationally determined from the formula (17).

The surface area A of the foam that can be computed from the bubble size can be determined from the formula (13). The formula (17) is substantially similar to the formula (9) and the physical property values in the formula can be computationally determined by means of the formulas (10) and (11).

As the concentration of the volatile components that are diffused into the foam are computed by means of the formulas (10), (11) and (17), the partial pressure of the volatile components in the foam can be computed from the formula (18). Then, the internal pressure of the foam can be computed by means of the formula (19) from the determined partial pressure.

Thus, the concentration of the volatile components contained in resin can be predicted in a foam devolatilization process by applying the determined value $P_D$ to the formulas (13) and (14).

Figure 3:
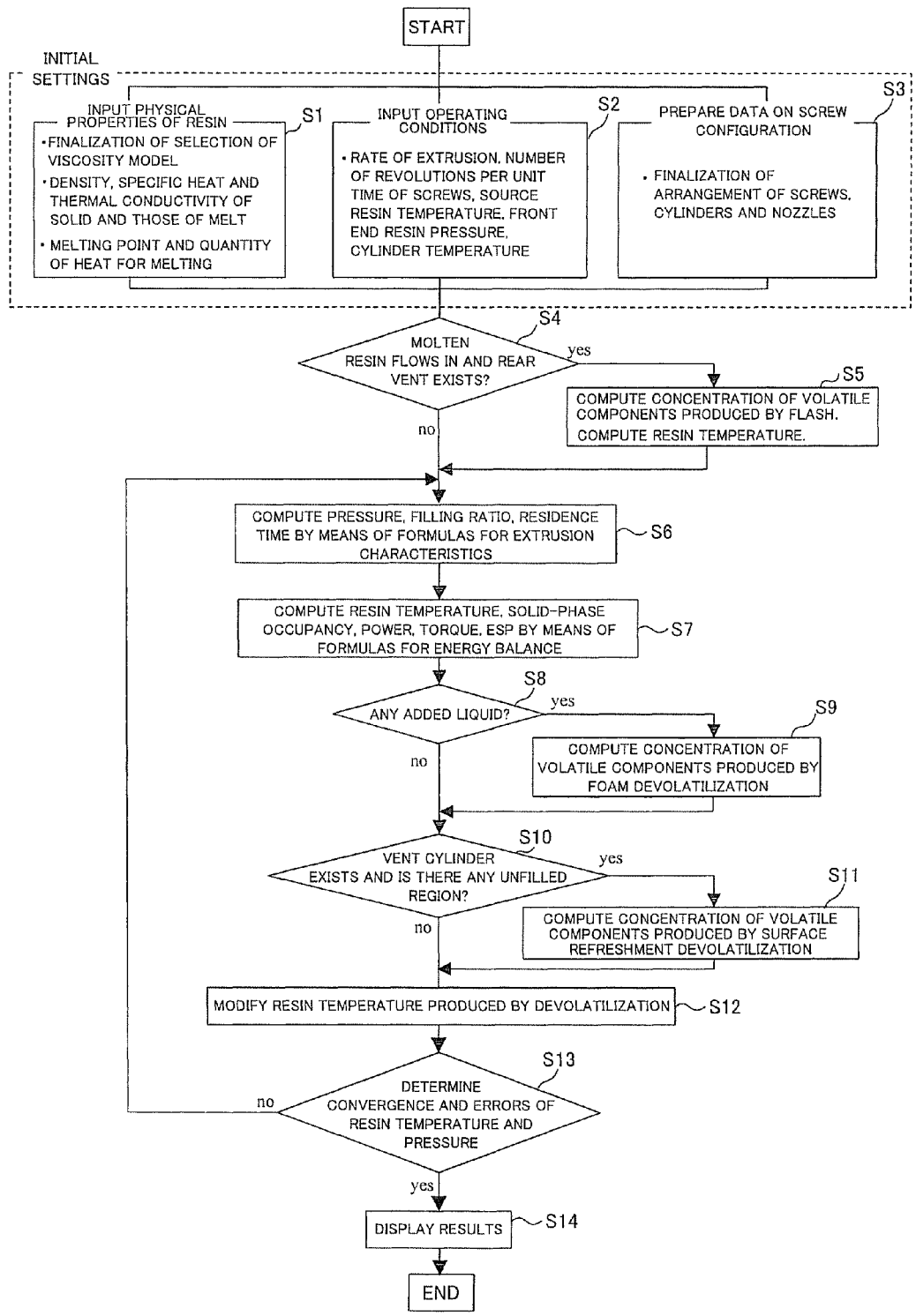
FIG. 3 is a flowchart of the operation according to an embodiment of the present invention.

The concentration of the volatile components is computed simultaneously in the process of computing the filling ratio, the pressure, the temperature, the solid-phase occupancy, the residence time, the torque and the power for the above-described three types of devolatilization pattern by following the flowchart of FIG. 3.

In this operation, the physical properties of the resin and the operating conditions are input and, at the same time, data on the configurations of the screws are prepared (Steps S1 through S3). If molten resin flows in and a rear vent is provided (Step S4, yes), the concentration of the volatile components due to a flash and the resin temperature are computed (Step S5). Then, the pressure, the filling ratio and the residence time are computed by means of the formulas for the characteristics of the extruder (Step S6).

Subsequently, the resin temperature, the solid-phase occupancy, the power, the torque and the ESP are computed by means of the formulas for energy balance (Step S7). When liquid is added (Step S8, yes), the concentration of the volatile components produced by foam devolatilization is computed (Step S9). When a vent cylinder and an unfilled region exist (Step S10, yes), the concentration of the volatile components produced by surface refreshment devolatilization is computed (Step S11).

Then, the resin temperature produced by devolatilization is modified (Step S12). Then, conversion is determined and, if the determination is negative because of errors in the resin temperature and the pressure (Step S13, yes), the process returns to Step S6. If, on the other hand, the determination is positive, the results are displayed (Step S14) and the process is ended.

Figure 4:
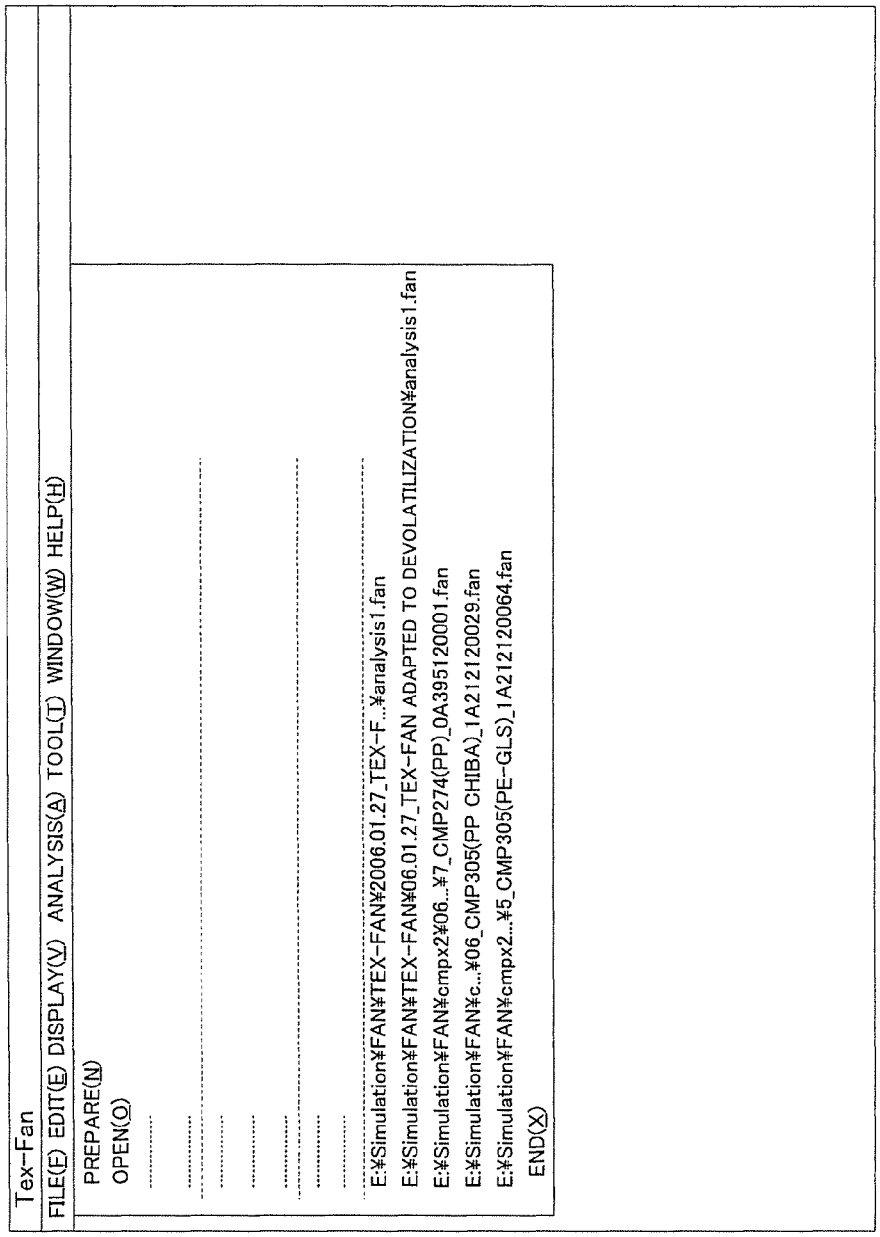
FIG. 4 is a schematic illustration of a start image displayed on a display screen.

FIG. 4 is a schematic illustration of a start image displayed on a display screen for a simulation by this embodiment.

Figure 5:
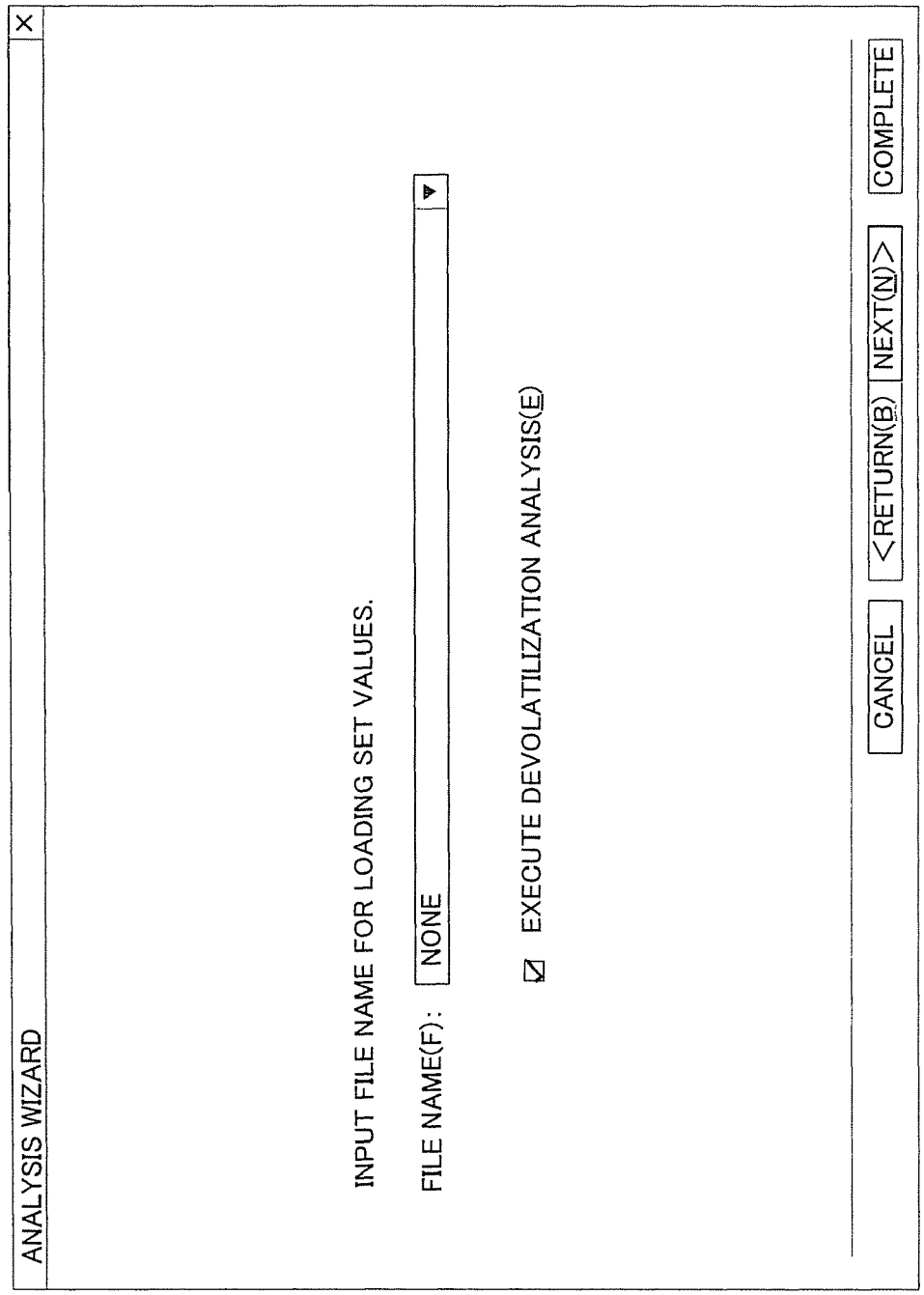
FIG. 5 is a schematic illustration of an image displayed when a new analysis is to be executed.

FIG. 5 is a schematic illustration of an image having a window and displayed when a new analysis is to be executed. Referring to the image, a check mark is entered to the item of "Execute a devolatilization analysis" when a devolatilization analysis is to be executed. When no check mark is entered there, no devolatilization analysis is executed as an automatic consequence regardless of the configurations of the screws, the cylinders and the liquid adding nozzles that are shown subsequently. Now, an instance where a devolatilization analysis is to be executed will be described below.

Figure 6:
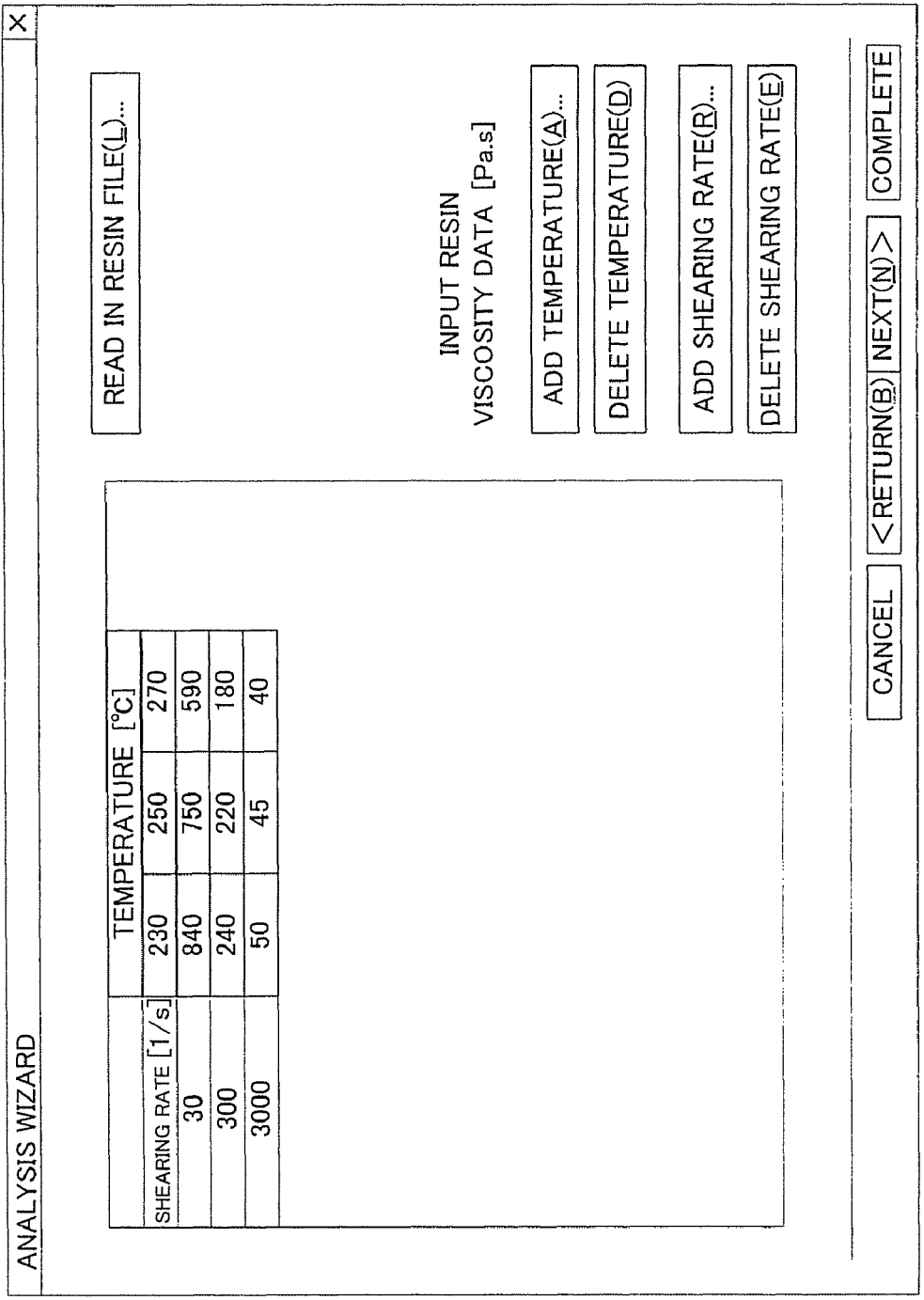
FIG. 6 is a schematic illustration of an image prompting the user to input the viscosity of the resin.
Figure 7:
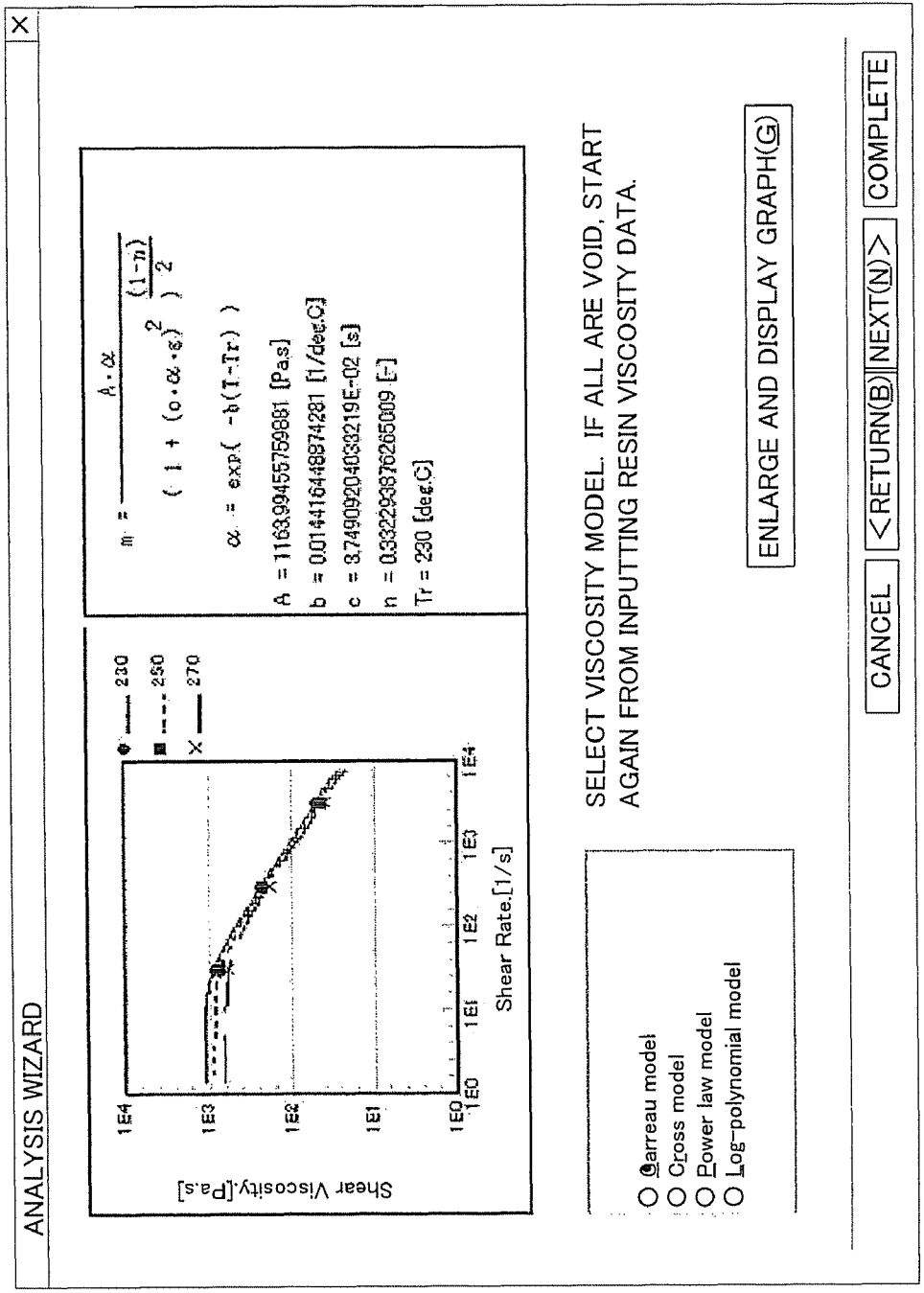
FIG. 7 is a schematic illustration of an image prompting the user to select and finalize the selection of a viscosity model.

FIGS. 6 through 8 are exemplar images prompting the user to enter the physical properties of the resin. FIG. 6 is an image for entering one of the shearing viscosities observed at various temperatures and shearing rate of the resin. FIG. 7 is an image for selecting and finalizing the selection of a viscosity model fitted to the input shearing viscosity. FIG. 8 is an image for selecting and inputting the density, the specific heat, the thermal conductivity and the melting point of and the quantity of heat for melting the solid and those of the melt.

The physical properties of the resin defined by means of these images can be stored in a file. Therefore, when a new analysis is to be executed sometime later on resin having the same physical properties, these values can be read out from the file in the image of FIG. 6 and hence it is not necessary to input the values in the images of FIGS. 6 through 8 again.

FIG. 9 is an image for selecting and inputting the physical properties of the volatile components contained in the resin. In this image, the user is prompted to enter the values of the vapor pressure parameters, the molecular weight, the boiling point, the specific heat, the density, the latent heat of vaporization, the critical temperature, the critical pressure, the critical density and the mutual interference coefficient necessary for the computations for devolatilization. The input physical property values are then employed for the devolatilization computations of the formulas (1) through (19).

Figure 10:
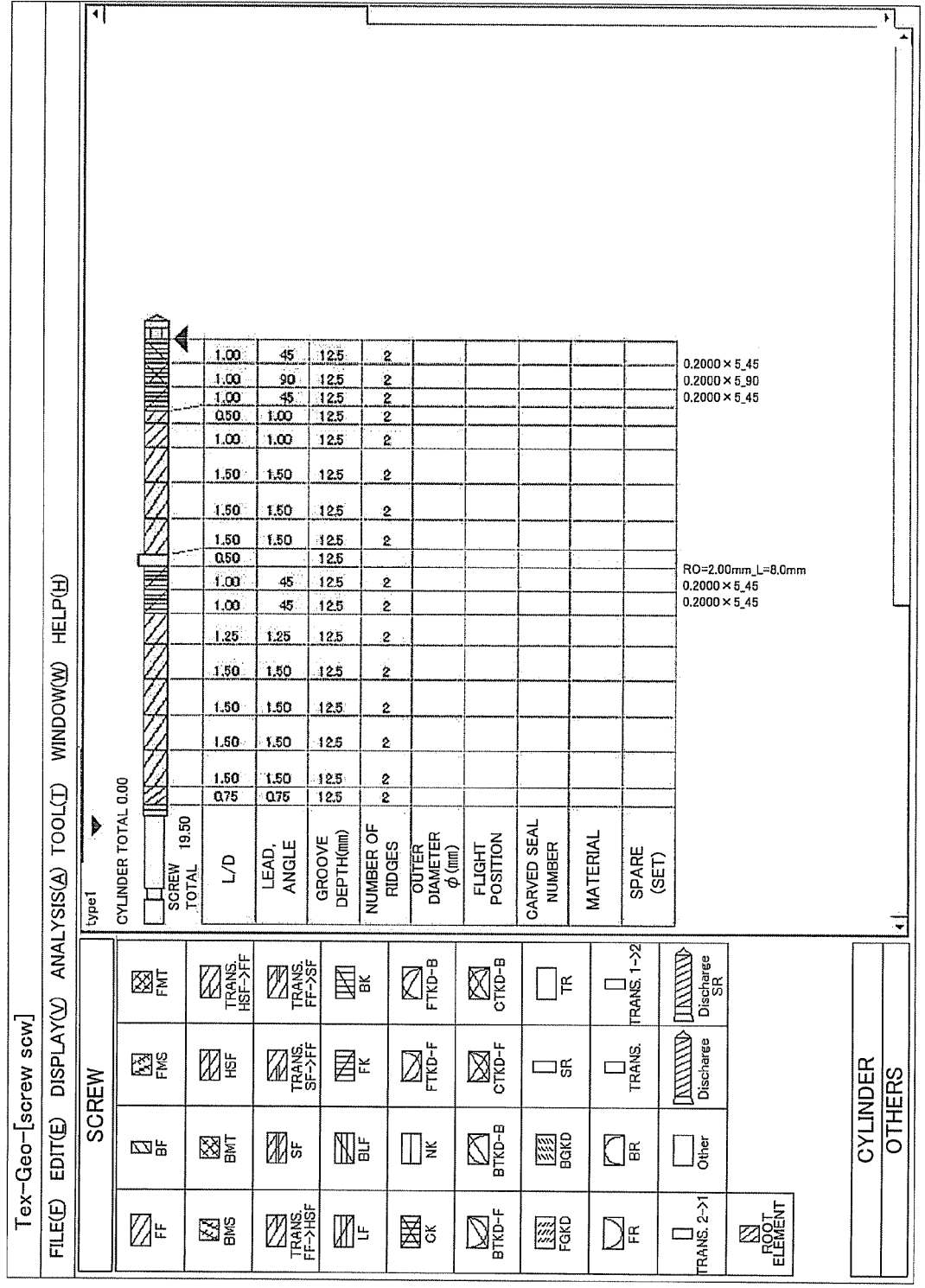
FIG. 10 is a schematic illustration of an image for defining the configurations of the screws.
Figure 11:
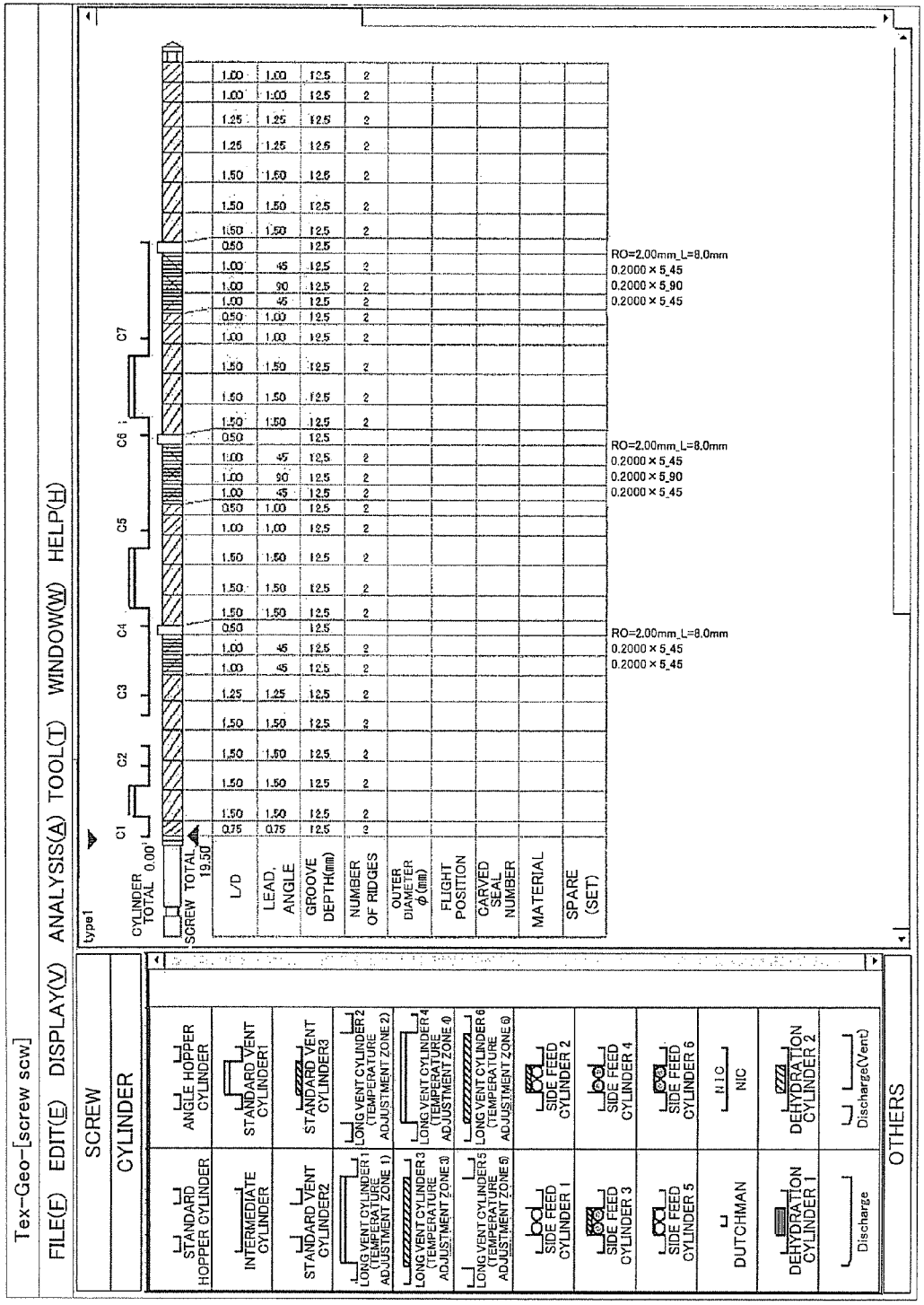
FIG. 11 is a schematic illustration of an image for defining the configurations of the cylinders.
Figure 12:
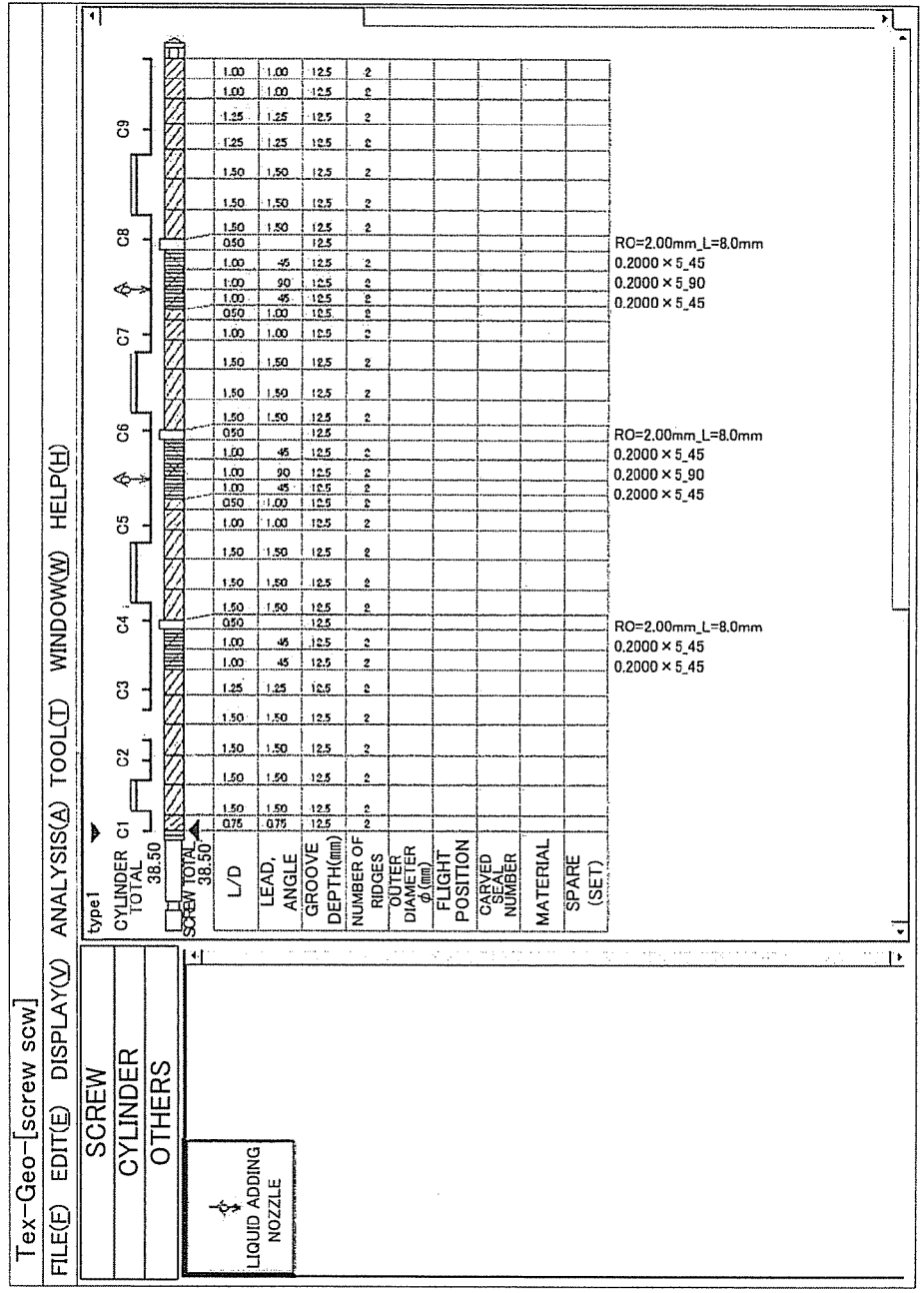
FIG. 12 is a schematic illustration of an image for defining the configurations of the liquid adding nozzles.

FIGS. 10 through 12 are images for defining the configurations of the screws, those of the cylinders and those of the liquid adding nozzles respectively.

When defining the configurations of the screws in the image of FIG. 10, the user makes selections from the screw piece list and ultimately selects optimum lengths. When defining the configurations of the cylinders in the image of FIG. 11, the user makes selections from the cylinder list and ultimately selects optimum lengths. When executing a devolatilization analysis, a vent cylinder needs to be arranged at appropriate positions. When executing flash devolatilization, the vent cylinder needs to be arranged upstream relative to the hopper cylinder.

When defining the configurations of the liquid adding nozzles in the image of FIG. 12, the user enters the cylinder numbers and the positions for installing the nozzles in the cylinders. When executing a water-injection foaming devolatilization analysis, at least a liquid adding nozzle needs to be installed at a position in the extruder. As the screws, the cylinders and the liquid adding nozzles are arranged at optimum respective positions, the program determines the positions of arrangement and then can automatically execute arithmetic operations for flash devolatilization, the surface refreshment devolatilization and foam devolatilization.

Figure 13:
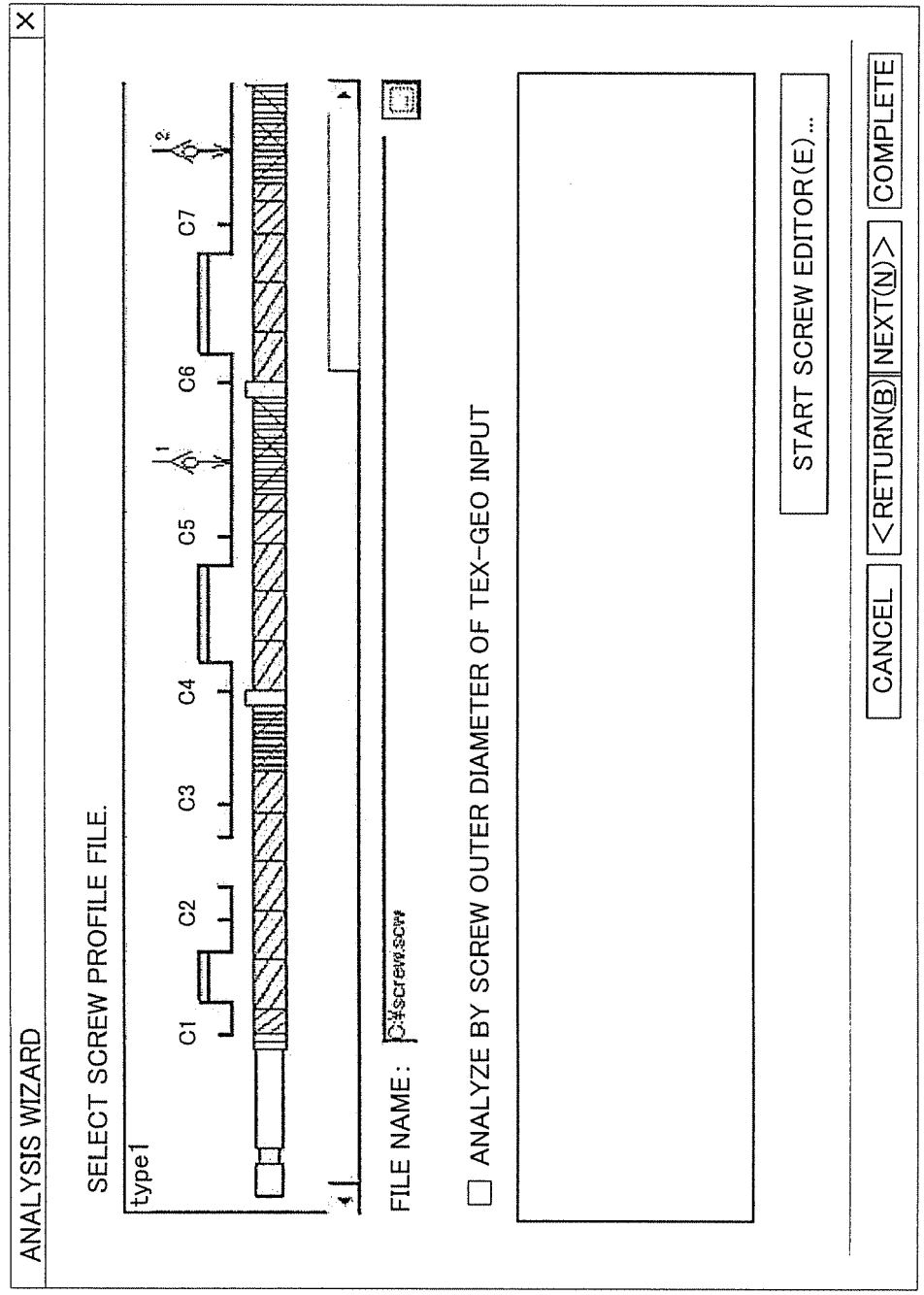
FIG. 13 is a schematic illustration of an image for selecting and finalizing the selection of the defined configurations of the screws, the cylinders and the liquid adding nozzles.

The screw configuration files formed and stored as a result of the operation using the images of FIGS. 10 through 12 can be selected in the image of FIG. 13.

Figure 14:
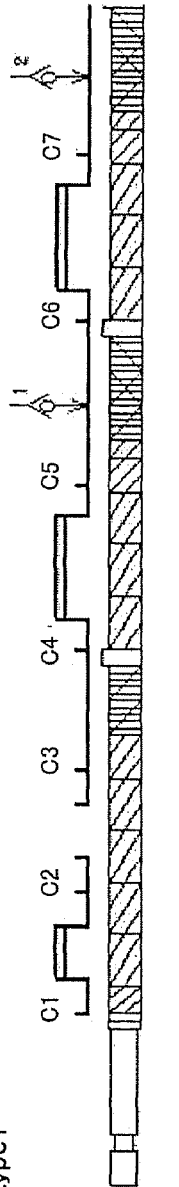
FIG. 14 is a schematic illustration of an image for defining the size of the extruder, the conditions of extrusion, and the cylinder temperatures.
Figure 15:
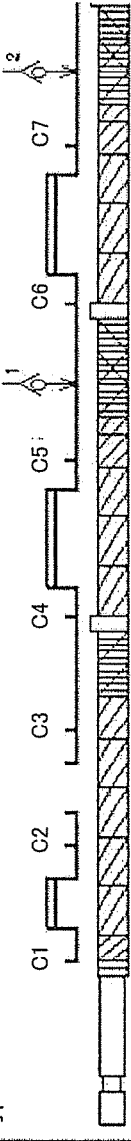
FIG. 15 is a schematic illustration of an image for defining the rate at which liquid is added, the initial concentration of the volatile components and the degree of vacuum of each vent cylinder.

FIG. 14 is an image for selecting the size, the rate of extrusion and the number of revolutions per unit time of the screws, the extruder front end resin pressure, the source resin temperature, and the cylinder temperature to be defined. FIG. 15 is an image for selecting the rate at which liquid is to be added, the initial concentration of the volatile components and the degree of vacuum of each vent cylinder.

As the initial value defining process is completed for the analysis as result of the above described operation, the computer executes the analysis and, when the analysis ends, the results of the analysis are automatically displayed.

Figure 16:
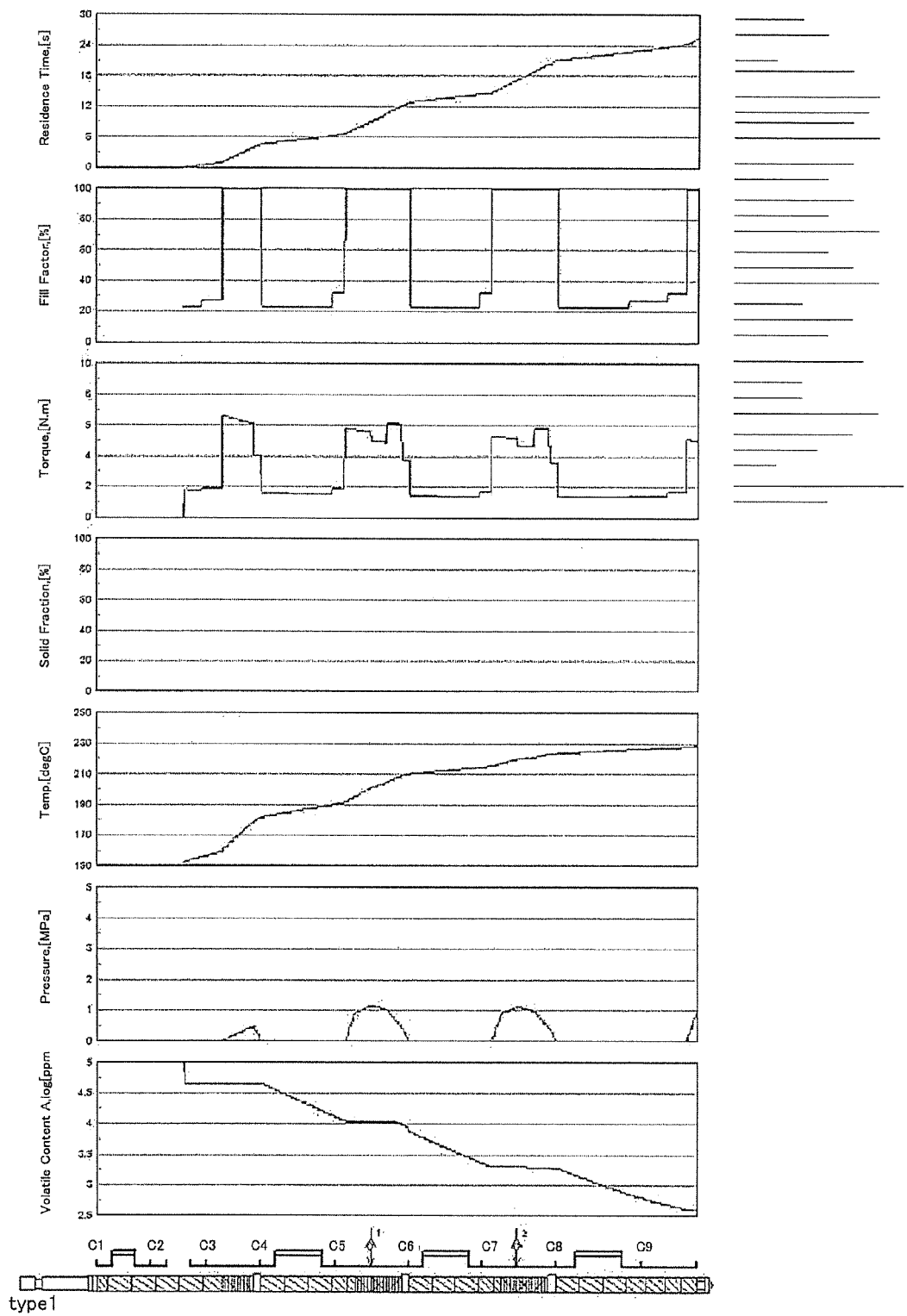
FIG. 16 a schematic illustration of an image displaying part 1 of the results of computations.

FIG. 16 is an exemplar image showing the results of the analysis. More specifically, FIG. 16 shows the residence time, the filling ratio, the torque, the solid-phase occupancy, the resin temperature, the pressure and the concentration of the volatile components contained in the resin are displayed in terms of distribution in the axial direction of the extruder.

Figure 17:
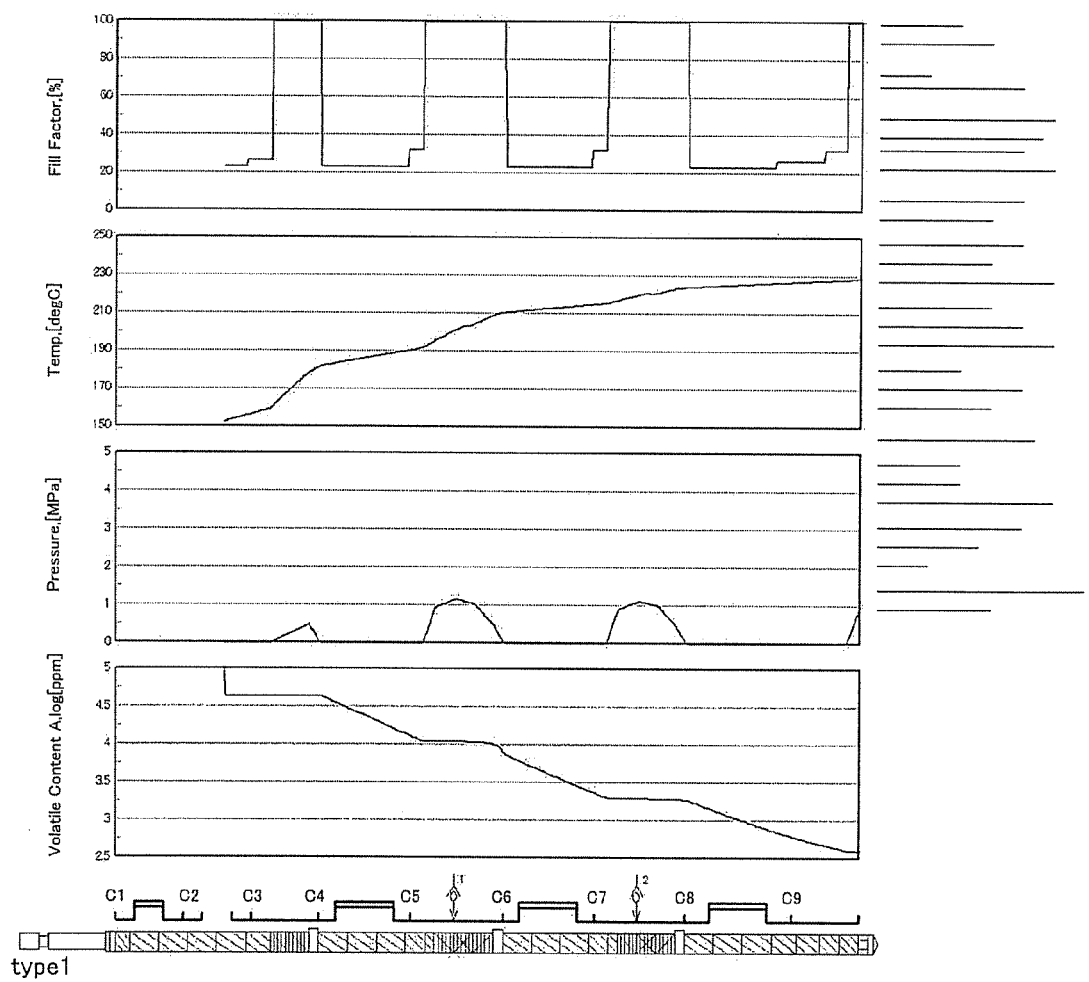
FIG. 17 is a schematic illustration of an image displaying part 2 of the results of computations.

FIG. 17 is an exemplar image showing only the filling ratio, the resin temperature, the pressure and the concentration of the volatile components contained in the resin that are selected and redisplayed. The initially defined values are shown at the right side of the image and additionally the ESP and the resin temperature at the outlet of the extruder are displayed along with the concentration of the volatile components contained in the resin after the devolatilization at each event.

In the instance shown in FIG. 17, resin with an initial concentration of the volatile components of 100,000 ppm is made to flow into the extruder and the concentration of the volatile components is reduced to 44,153 ppm immediately after the flow in by flash devolatilization. Then, the concentration of the volatile components is further reduced to 11,125 ppm at the C4 cylinder by surface refreshment devolatilization and then to 2.024 ppm at the C5 cylinder by foam devolatilization as a result of adding liquid, which is water, by 1 wt % and by surface refreshment devolatilization at the C6 cylinder. The concentration of the volatile components is finally reduced to 413 ppm at the C7 cylinder by foam devolatilization as a result of adding liquid, which is water, by 1 wt % and by surface refreshment devolatilization at the C8 cylinder. The value of 413 ppm is the final concentration of the volatile components contained in the resin that is extruded from the extruder.

The invention claimed is:

1. A devolatilization simulation apparatus for screw extruders, comprising:
   a memory that stores:
      instructions for determining parameters inside of a screw extruder from a configuration of the extruder, operating conditions of the extruder and physical properties of a resin inside the extruder comprising a concentration of volatile components; and
      instructions for simulating a flash devolatilization process for the volatile components based at least in part on the parameters, wherein the concentration of the volatile components gradually decreases as the volatile components undergo the devolatilization process,
   wherein the instructions for simulating the flash devolatilization process comprise:

$C_{DEV} = (X/100)Q - C_{OUT}, \rho_A\square = \rho_{AR} x \omega,$ $\rho\square = 1/[(1-x/100)/\rho_p] + (x/100)(1/\rho_A),$ and $C_{A0} = (P_A/S_A)(\rho_A/\rho)/\exp(1+\chi),$ where $C_{out}$ is a quantity of the volatile components that flow out, $C_{AO}$ is an equilibrium concentration, $C_{DEV}$ is a quantity of discharged volatile components, $\omega$ is an expansion factor, $\rho$ is a density of a mixture solution, $\rho_{AR}$ is a density of the volatile components at a reference temperature, $\rho_A$ is a density of the volatile components in the mixture solution, $\rho_p$ is a density of the resin, $S_A$ is a saturated vapor pressure of the volatile components, $P_A$ is a partial pressure of the volatile components and X is a mutual interference coefficient of the volatile components; and a processor that executes the instructions for determining and the instructions for simulating.

2. A devolatilization simulation apparatus for screw extruders, comprising:
   a memory that stores:
      instructions for determining parameters inside of a screw extruder from a configuration of the extruder, operating conditions of the extruder and physical properties of a resin inside the extruder comprising a concentration of volatile components; and
      instructions for simulating a surface refreshment process for the volatile components based at least in part on the parameters, wherein the concentration of the volatile components gradually decreases as the volatile components undergo the devolatilization process,
   wherein the instructions for simulating the surface refreshment process comprise:

$(C_{in} - C_A)/(C_{out} - C_A) = X = \exp(K'L'N^2/Q),$ $C_{out} = C_A + (C_{in} - C_A)/X$ and $C_A = (P_c/P_v)(\square\rho_g/\rho_p)/\exp(1+\chi),$ where $C_{in}$ is a concentration of the volatile components that flow in, $C_{out}$ is a concentration of the volatile components that flow out, $C_A$ is an equilibrium concentration in a devolatilization region, K' is a parameter that is determined according to a devolatilization diffusion coefficient, L' is a surface area of a resin from which the volatile components splash away in the devolatilization region, N is a number of revolutions per unit time of the screw, Q is an extruded quantity, $P_c$ is an atmospheric pressure, $P_v$ is a vapor pressure of the volatile components, $\rho_g$ is a density of the volatile components, $\rho_p$ is a density of the resin, $\chi$ is a mutual interference coefficient and X is a devolatilization efficiency; and a processor that executes the instructions for determining and the instructions for simulating.

3. A devolatilization simulation apparatus for screw extruders, comprising:
   a memory that stores:
      instructions for determining parameters inside of a screw extruder from a configuration of the extruder, operating conditions of the extruder and physical properties of a resin inside the extruder comprising a concentration of volatile components; and
      instructions for simulating a foam devolatilization process for the volatile components based at least in part on the parameters, wherein the concentration of the volatile components gradually decreases as the volatile components undergo the devolatilization process,
   wherein the instructions for simulating the foam devolatilization process comprise:

$(C_{in} - CA)/(C_{out} - C_A) = X = \exp(K'AN^{1/2}/Q),$ $P_{DA} = nR_gT/V_A,$ $P_D = P_{DA} + P_{DB},$ $dR/dt = R/4\eta(P_D - P_c - 2\chi/R)$ and $dP_{DB}/dt = 3 DR_gT/R\partial c/\partial R|_{r=R} - 3 P_D/R \, dR/dt,$ where $C_{in}$ is a concentration of the volatile components that flow in, $C_{out}$ is a concentration of the volatile components that flow out, $C_A$ is an equilibrium concentration in a devolatilization region, K' is a parameter that is determined according to a devolatilization diffusion coefficient, A is a surface area of the foam, N is a number of revolutions per unit time of the screw, Q is an extruded quantity, n is a mole number of the volatile components per foam, $R_g$ is the gas constant, T is an atmospheric temperature, $P_{DA}$ is a partial pressure of the volatile components in the foam and $P_{DB}$ is a partial pressure of an additive in the foam; and a processor that executes the instructions for determining and the instructions for simulating.

* * * * *